(12) United States Patent
Tachibana et al.

(10) Patent No.: US 9,097,867 B2
(45) Date of Patent: Aug. 4, 2015

(54) COATED OPTICAL FIBER

(71) Applicant: SUMITOMO ELECTRIC INDUSTRIES, LTD., Osaka-shi, Osaka (JP)

(72) Inventors: Kumiko Tachibana, Yokohama (JP); Takashi Fujii, Yokohama (JP); Takashi Takada, Yokohama (JP); Noriaki Iwaguchi, Yokohama (JP); Yoshinori Yamamoto, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 13/923,869

(22) Filed: Jun. 21, 2013

(65) Prior Publication Data
US 2013/0343717 A1 Dec. 26, 2013

(30) Foreign Application Priority Data
Jun. 22, 2012 (JP) ................. 2012-141152

(51) Int. Cl.
*G02B 6/44* (2006.01)
*G02B 6/02* (2006.01)
*C08G 18/67* (2006.01)
*C08G 18/28* (2006.01)
*C09D 175/04* (2006.01)
*C08G 18/48* (2006.01)
*G02B 6/036* (2006.01)

(52) U.S. Cl.
CPC ............... *G02B 6/44* (2013.01); *C08G 18/282* (2013.01); *C08G 18/289* (2013.01); *C08G 18/48* (2013.01); *C08G 18/672* (2013.01); *C09D 175/04* (2013.01); *G02B 6/02395* (2013.01); *G02B 6/03627* (2013.01)

(58) Field of Classification Search
CPC .................................................. G02B 6/02395
USPC ........................................................... 385/128
See application file for complete search history.

(56) References Cited

U.S. PATENT DOCUMENTS

| | | | | |
|---|---|---|---|---|
| 5,093,386 A | * | 3/1992 | Bishop et al. | 522/96 |
| 6,362,249 B2 | * | 3/2002 | Chawla | 522/182 |
| 6,907,175 B2 | * | 6/2005 | Suzuki et al. | 385/128 |
| 8,093,322 B2 | | 1/2012 | Hancock, Jr. et al. | |
| 8,709,586 B2 | * | 4/2014 | Yano et al. | 428/298.7 |
| 2003/0053777 A1 | * | 3/2003 | Fujii et al. | 385/123 |
| 2003/0176522 A1 | * | 9/2003 | Komiya et al. | 522/71 |

(Continued)

FOREIGN PATENT DOCUMENTS

| | | |
|---|---|---|
| JP | A-H02-138324 | 5/1990 |
| JP | A-H02-221907 | 9/1990 |
| JP | 2002356521 A * | 12/2002 |

(Continued)

*Primary Examiner* — Charlie Y Peng
(74) *Attorney, Agent, or Firm* — Drinker Biddle & Reath LLP

(57) ABSTRACT

A coated optical fiber 1 comprising a glass fiber 10 and a primary coating layer 20 on the outer circumference of the glass fiber 10, wherein a resin constituting the primary coating layer 20 contains ingredient(s) having a molecular weight of more than 1,000, which is extracted with methyl ethyl ketone, in an amount of 5% by weight or more and 21% by weight or less and has a Young's modulus of 0.2 to 1.0 MPa. The resin constituting the primary coating layer 20 of the coated optical fiber 1 has a good curability, and the coated optical fiber 1 exhibits a reduced microbending loss.

33 Claims, 3 Drawing Sheets

(56) References Cited

U.S. PATENT DOCUMENTS

| | | |
|---|---|---|
| 2007/0100039 A1 | 5/2007 | Hancock et al. |
| 2010/0158469 A1* | 6/2010 | Bulters et al. ............... 385/141 |
| 2012/0321270 A1 | 12/2012 | Imai et al. |
| 2013/0302003 A1* | 11/2013 | Bookbinder et al. ........ 385/128 |

FOREIGN PATENT DOCUMENTS

| | | |
|---|---|---|
| JP | A-2005-202440 | 7/2005 |
| JP | 2008233273 A * | 10/2008 |
| JP | 2009-514994 A | 4/2009 |
| JP | 2012-111924 | 6/2012 |

* cited by examiner

COATED OPTICAL FIBER

CROSS-REFERENCE TO RELATED APPLICATIONS

This application claims priority from Japanese Patent Application No. 2012-141152, filed on Jun. 22, 2012, the entire contents of which are hereby incorporated by reference.

FIELD OF THE INVENTION

The present invention relates to a coated optical fiber comprising a glass fiber and a resin coating layer provided on the outer circumstance of the glass fiber.

A coated optical fiber is obtained by heating and melting a glass rod, drawing a glass fiber from the glass rod and coating the glass fiber with a resin for the purpose of protection and reinforcement. As the resin coating, there is, for example, known two-layer structure resin coating where a soft primary coating layer is first provided on the surface of an optical fiber and a highly rigid secondary coating layer having high Young's modulus is provided outside the primary coating layer. In such a coated optical fiber, transmission loss thereof is influenced to a large extent by the physical properties and structure of the resin to be applied around glass. For example, even when the coating resin is in a stable state after curing, a minute physical strain may occur in the coating resin by stress and strain newly imparted to the coated optical fiber during operations such as rewinding. When distribution of the strain becomes inhomogeneous depending on the portion of the coated optical fiber, excessive transmission loss called microbending loss may be generated in some cases.

JP-T-2009-514994 discloses the method for improving the toughness of a covered optical fiber having two-layer coating of a primary coating and a secondary coating surrounding an optical fiber by adding a non-reactive oligomer additive to the secondary coating layer that is an outer coating layer.

However, in the covered optical fiber described in Patent Document 1, although protection and reinforcement of the glass fiber is achieved by making the outer coating layer tough, the reduction of microbending loss and the improvement of transmission properties have not been investigated.

As a method for reducing the microbending loss of a coated optical fiber, there is known a method for preventing propagation of an external force to the glass fiber by buffering the external force with using a resin having a small Young's modulus as a primary coating layer that comes into contact with the glass fiber. However, for decreasing the Young's modulus in this method, it is necessary to reduce crosslinking points between oligomers contained in a resin that undergoes a curing reaction. Therefore, in this method, there is a concern that a problem of a decrease in curability may arise.

SUMMARY OF INVENTION

For solving the above problems in the conventional coated optical fibers, an object of the present invention is to provide a coated optical fiber that is coated with a resin having a good curability and exhibits a reduced microbending loss.

DETAILED DESCRIPTION OF EXEMPLARY EMBODIMENT

Figure 1:
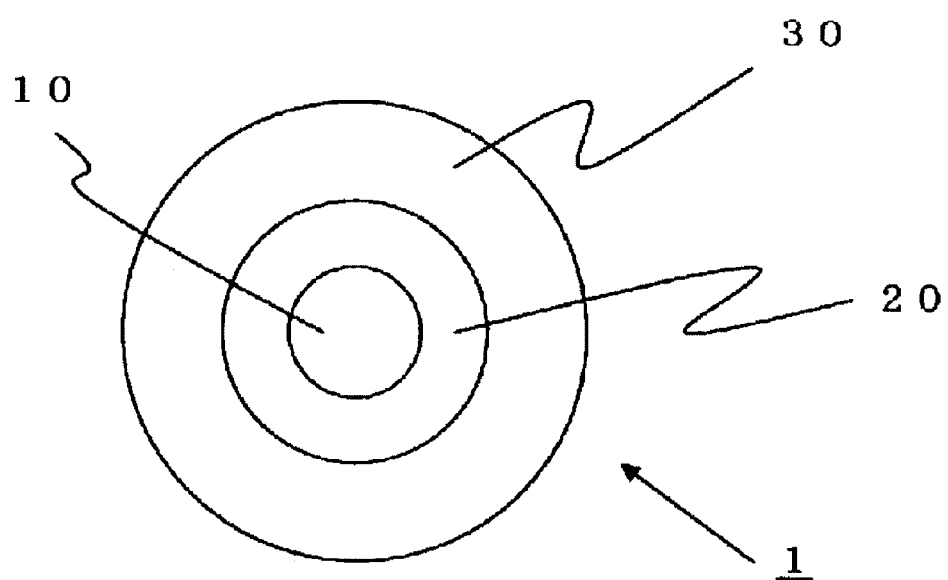
FIG. 1 is a schematic cross-sectional view showing one example of the coated optical fiber of the invention.

In order to solve the above problems, the present inventors have conceived an idea that a coating resin having a small Young's modulus is obtained without reducing density of reaction points in a resin that undergoes a curing reaction, by incorporating a non-reactive oligomer into an ultraviolet curable coating material that forms the primary coating layer, since the non-reactive oligomer acts like a plasticizer.

Namely, the coated optical fiber of the invention is as follows.

[1] A coated optical fiber comprising a glass fiber and a primary coating layer on the outer circumference of the glass fiber,
wherein a resin constituting the primary coating layer contains an ingredient having a molecular weight of more than 1,000, which is extracted with methyl ethyl ketone, in an amount of 5% by weight or more and 21% by weight or less and has a Young's modulus of 0.2 to 1.0 MPa.

[2] The coated optical fiber according to [1], wherein the resin constituting the primary coating layer contains a reactive oligomer having a reactive group and a molecular weight of 5,000 to 30,000.

[3] The coated optical fiber according to [1], wherein the resin constituting the primary coating layer contains the following (A) and (B), and the (B) has a width of molecular weight distribution the same as that of the following (A):
(A) a (meth)acryloyl group-containing urethane oligomer obtained by reacting at least an aliphatic polyether-based polyol, an organic polyisocyanate, a hydroxyl group-containing (meth)acrylate, and γ-mercaptopropyltrimethoxysilane;
(B) a (meth)acryloyl group-non-containing urethane oligomer obtained by reacting at least an aliphatic polyether-based polyol, an organic polyisocyanate, and a monohydric alcohol.

[4] The coated optical fiber according to [1], wherein the resin constituting the primary coating layer contains the following (A) and the (A) accounts for 80 to 95% by weight of the total oligomer contained in the primary coating layer:
(A) a (meth)acryloyl group-containing urethane oligomer obtained by reacting at least an aliphatic polyether-based polyol, an organic polyisocyanate, a hydroxyl group-containing (meth)acrylate, and γ-mercaptopropyltrimethoxysilane.

[5] The coated optical fiber according to [1], wherein the resin constituting the primary coating layer contains:
(A) a (meth)acryloyl group-containing urethane oligomer obtained by reacting at least an aliphatic polyether-based polyol, an organic polyisocyanate, a hydroxyl group-containing (meth)acrylate, and γ-mercaptopropyltrimethoxysilane;
(B) a (meth)acryloyl group-non-containing urethane oligomer obtained by reacting at least an aliphatic polyether-based polyol, an organic polyisocyanate, and a monohydric alcohol;
(C) a reactive diluent; and
(D) a photo radical initiator.

[6] The coated optical fiber according to any one of [1] to [5], wherein an increase in transition loss when it is placed at −40° C. for 2 hours is 0.01 dB/km or less.

[7] The coated optical fiber according to any one of [1] to [6], wherein the Young's modulus of the primary coating layer is from 0.6 to 1.0 MPa.
[8] The coated optical fiber according to [1], wherein the Young's modulus of the primary coating layer is from 0.6 to 1.0 MPa and an increase in transition loss when the coated optical fiber is placed at −40° C. for 2 hours is 0.01 dB/km or less.
[9] The coated optical fiber according to [1], wherein a secondary coating layer is further provided outside the primary coating layer and the Young's modulus of the secondary coating layer is from 1,000 MPa to 1,800 MPa.
[10] The coated optical fiber according to claim [1], wherein the ultraviolet curable coating material further contains (E) a surfactant.
[11] The coated optical fiber according to [10], wherein the ultraviolet curable coating material contains the surfactant in an amount of 0.1 to 1.0% by weight.
[12] The coated optical fiber according to [1], wherein the resin constituting the primary coating layer is an ultraviolet curable coating material containing a reactive diluent composed of a monofunctional reactive diluent and a polyfunctional reactive diluent and the ratio of the polyfunctional reactive diluent to the monofunctional reactive diluent is 1/9 or more.
[13] The coated optical fiber according to any one of [1] to [12], wherein effective cross-sectional area of the core of the glass fiber is larger than 100 μm².
[14] The coated optical fiber according to [13], wherein, when relative refractive index of the core of the glass fiber to pure silica is n1, relative refractive index of the first cladding just outside the core to pure silica is n2, and relative refractive index of the second cladding outside the first cladding to pure silica is n3, n1>n3>n2, 0.24%≤n1−n2≤0.36% and 0.02%≤n3−n2≤0.15%, and the diameter of the core is 11 μm or more and 15 μm or less and the ratio of the diameter of the first cladding to the diameter of the core is 2.5 or more and 6 or less.

According to the present invention, it is possible to provide a coated optical fiber that is coated with a primary coating layer composed of a resin having a good curability and exhibits a reduced microbending loss.

The following will describe the coated optical fiber of one embodiment of the invention in detail with reference to FIG. 1.

FIG. 1 is a schematic cross-sectional view showing one example of the coated optical fiber of the invention.

A coated optical fiber 1 has a glass fiber 10 and a primary coating layer 20 on the outer circumference of the glass fiber 10 and further a secondary coating layer 30 obtained by curing a curable resin on the outer circumference thereof. A resin coating layer is formed of the primary coating layer 20 and the secondary coating layer 30. The layer structure of the resin coating layer is not limited to the two-layer structure shown in FIG. 1 and may be a multilayer structure further having a third coating layer and a fourth coating layer.

The glass fiber 10 usually has a cladding layer composed of silica glass on the outer circumference of a core layer composed of a silica-based glass. The outer diameter of the core layer may be, for example, from 7 μm to 60 μm and the outer diameter of the cladding layer may be, for example, 125 μm.

The primary coating layer 20 is a layer of a cured resin layer formed on the outer circumference of the glass fiber 10 and the thickness thereof may be, for example, from 10 μm to 50 μm.

The primary coating layer 20 is formed by curing an ultraviolet curable coating material. When the primary coating layer is extracted with methyl ethyl ketone, unreacted ingredients in the ultraviolet curable coating material are extracted. Of these, ingredients having a molecular weight more than 1,000 are non-reactive oligomers. In the coated optical fiber of the invention, they are contained in the primary coating layer in an amount of 5% by weight or more and 21% by weight or less. The Young's modulus of the resin after curing of the primary coating layer of the coated optical fiber of the invention is from 0.2 to 1.0 MPa. When the Young's modulus of the primary coating layer is less than 0.2 MPa, the strength required for the coated optical fiber becomes insufficient and, when the modulus exceeds 1.0 MPa, it becomes difficult to buffer an external force. By controlling the Young's modulus to from 0.2 MPa to 1.0 MPa, microbending loss can be reduced while a certain strength required for the coated optical fiber is maintained. Here, the certain strength is a strength required for reducing transmission loss to be caused by bending.

In the invention, the above Young's modulus of the resin after curing is measured in an optical fiber state.

In the coated optical fiber of the invention, the ultraviolet curable coating material contains (A) a (meth)acryloyl group-containing urethane oligomer obtained by reacting at least an aliphatic polyether-based polyol, an organic polyisocyanate, a hydroxyl group-containing (meth)acrylate, and γ-mercaptopropyltrimethoxysilane; (B) a (meth)acryloyl group-non-containing urethane oligomer obtained by reacting at least an aliphatic polyether-based polyol, an organic polyisocyanate, and a monohydric alcohol; (C) a reactive diluent; and (D) a photo radical initiator. Moreover, the ultraviolet curable coating material can further contain (E) a surfactant. The following will describe ingredients contained in the ultraviolet curable coating material in detail.

The (A) (meth)acryloyl group-containing urethane oligomer obtained by reacting at least an aliphatic polyether-based polyol, an organic polyisocyanate, a hydroxyl group-containing (meth)acrylate, and γ-mercaptopropyltrimethoxysilane (hereinafter also referred to as "(A) (meth)acryloyl group-containing urethane oligomer") is a reactive oligomer having a reactive group. The molecular weight is preferably from about 5,000 to 30,000. The curing of the resin is performed by polymerizing the (A) (meth)acryloyl group-containing urethane oligomers themselves or polymerizing it with the (C) reactive diluent that is a reactive monomer. The (A) (meth) acryloyl group-containing urethane oligomer preferably accounts for 80 to 95% by weight of the total oligomer. When it is contained such a ratio, the curability of the primary coating layer is assured and it becomes easy to obtain a good hardness.

Examples of the aliphatic polyether-based polyol include polyethylene glycol, polypropylene glycol, polytetramethylene glycol, polyhexamethylene glycol, polyheptamethylene glycol, polydecamethylene glycol, and polyether diols obtained by ring-opening copolymerization of two or more ionically polymerizable cyclic compounds.

Examples of the ionically polymerizable cyclic compounds include cyclic ethers such as ethylene oxide, propylene oxide, butene-1-oxide, isobutene oxide, 3,3-bischloromethyloxetane, tetrahydrofuran, 2-methyltetrahydrofuran, 3-methyltetrahydrofuran, dioxane, trioxane, tetraoxane, cyclohexene oxide, styrene oxide, epichlorohydrin, glycidyl methacrylate, allyl glycidyl ether, allyl glycidyl carbonate, butadiene monoxide, isoprene monoxide, vinyloxetane, vinyltetrahydrofuran, vinylcylcohexene oxide, phenyl glycidyl ether, butyl glycidyl ether, and benzoic acid glycidyl ester.

Specific examples of the polyether diols obtained by ring-opening copolymerization of two or more ionically polymerizable cyclic compounds include binary copolymers obtained from combinations of tetrahydrofuran and propylene oxide, tetrahydrofuran and 2-methyltetrahydrofuran, tetrahydrofuran and 3-methyltetrahydrofuran, tetrahydrofuran and ethylene oxide, propylene oxide and ethylene oxide, butene-1-oxide and ethylene oxide, and the like; and a ternary copolymer obtained from a combination of tetrahydrofuran, butene-1-oxide and ethylene oxide.

These aliphatic polyether-based polyols may be used singly or two or more thereof may be used in combination.

As the organic polyisocyanate, an aromatic diisocyanate, an alicyclic diisocyanate, an aliphatic diisocyanate, and the like may be mentioned.

Examples of the aromatic diisocyanate include 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, bis(2-isocyanatoethyl)fumarate, 6-isopropyl-1,3-phenylene diisocyanate, 4-diphenylpropane diisocyanate, and tetramethylxylylene diisocyanate.

Example of the alicyclic diisocyanate include isophorone diisocyanate, methylenebis(4-cyclohenyl isocyanate), hydrogenated diphenylmethane diisocyanate, hydrogenated xylylene diisocyanate, 2,5-bis(isocyanatomethyl)-bicyclo[2.2.1]heptane, and 2,6-bis(isocyanatomethyl)-bicyclo[2.2.1]heptane.

Examples of the aliphatic diisocyanate include 1,6-hexane diisocyanate, 2,2,4-trimethylhexamethylene diisocyanate, and lysine diisocyanate.

Of these, in view of economical efficiency and in view of obtaining compositions of stable quality, aromatic diisocyanates are more preferred and 2,4-tolylene diisocyanate and 2,6-tolylene diisocyanate are particularly preferred. These organic polyisocyanates may be used singly or two or more thereof may be used in combination.

As the hydroxyl group-containing (meth)acrylate, it is preferred to use a hydroxyl group-containing (meth)acrylate in which the hydroxyl group is bonded to a primary carbon atom (hereinafter also referred to as a "primary hydroxyl group-containing (meth)acrylate") and a hydroxyl group-containing (meth)acrylate in which the hydroxyl group is bonded to a secondary carbon atom (hereinafter also referred to as a "secondary hydroxyl group-containing (meth)acrylate"). A hydroxyl group-containing (meth)acrylate in which the hydroxyl group is bonded to a tertiary carbon atom (hereinafter also referred to as a "tertiary hydroxyl group-containing (meth)acrylate") is not preferred since it is inferior in reactivity with an isocyanate group.

Examples of the primary hydroxyl group-containing (meth)acrylate include 2-hydroxyethyl(meth)acrylate, 3-hydroxypropyl(meth)acrylate, 4-hydroxybutyl(meth)acrylate, 1,6-hexanediol mono(meth)acrylate, pentaerythritol tri(meth)acrylate, dipentaerythritol penta(meth)acrylate, neopentyl glycol mono(meth)acrylate, trimethylolpropane di(meth)acrylate, and trimethylolethane di(meth)acrylate.

Examples of the secondary hydroxyl group-containing (meth)acrylate include 2-hydroxypropyl(meth)acrylate, 2-hydroxybutyl(meth)acrylate, 2-hydroxy-3-phenyloxypropyl(meth)acrylate, and 4-hydroxycyclohexyl(meth)acrylate. In addition, compounds obtained by the addition reaction of glycidyl group-containing compounds such as an alkyl glycidyl ether, allyl glycidyl ether, and glycidyl(meth)acrylate with (meth)acrylic acid are also mentioned.

The (B) (meth)acryloyl group-non-containing urethane oligomer obtained by reacting at least an aliphatic polyether-based polyol, an organic polyisocyanate, and a monohydric alcohol (hereinafter also referred to as "(B) (meth)acryloyl group-non-containing urethane oligomer") is a non-reactive oligomer having no reactive group. The (B) (meth)acryloyl group-non-containing urethane oligomer is one example of the ingredients having a molecular weight of more than 1,000, which is extracted with methyl ethyl ketone. The (B) (meth)acryloyl group-non-containing urethane oligomer preferably accounts for from 5 to 21% by weight of the total oligomer.

By incorporating the (B) (meth)acryloyl group-non-containing urethane oligomer that is a non-reactive oligomer into the ultraviolet curable coating material, the Young's modulus after curing of the resin constituting the primary coating layer can be reduced without influencing the curability. The following will describe the mechanism.

Since a usual ultraviolet curable coating material containing no non-reactive oligomer affords a dense crosslinked structure, Young's modulus becomes too large from the viewpoint of reducing the microbending loss. Therefore, as a method for lowering Young's modulus, an oligomer having decreased reaction points has hitherto been used. Thereby, since the crosslinked structure becomes coarse, the Young's modulus lowers but, since the reaction points in the oligomer decrease, the crosslinking rate lowers. On the other hand, in the case where a non-reactive oligomer is used, since uncrosslinked oligomer remains in the resin after curing without decreasing the reaction points of the reactive oligomer, the Young's modulus can be lowered without influencing the crosslinking rate. This is further described in detail with reference to FIG. 2.

Figure 2:
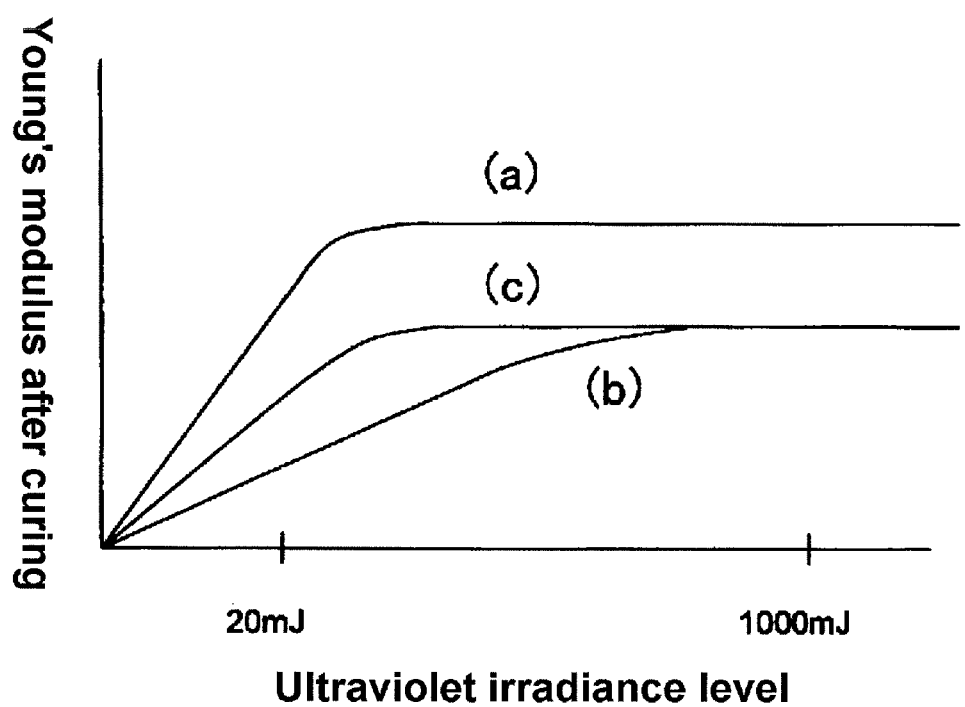
FIG. 2 is a graph showing a dose of ultraviolet irradiation at curing a curable resin (ultraviolet curable coating material) and Young's modulus after curing.

FIG. 2 is a graph showing a dose of ultraviolet irradiation at curing a curable resin (ultraviolet curable coating material) and Young's modulus after curing.

In the Figure, (a), (b), and (c) are graphs showing a dose of ultraviolet irradiation and Young's modulus after curing for each of (a) the ultraviolet curable coating material using a reactive oligomer, (b) the ultraviolet curable coating material using a reactive oligomer having decreased reaction points for lowering the Young's modulus, and (c) the ultraviolet curable coating material using a reactive oligomer containing a non-reactive oligomer. In all the cases of (a), (b), and (c), the Young's modulus reaches a saturated value in the case of irradiation with 1,000 mJ/cm$^2$ of ultraviolet rays and the Young's modulus does not reach the saturated value in the case of irradiation with 20 mJ/cm$^2$ of ultraviolet rays. Therefore, the ratio of the Young's modulus at the irradiation with 20 mJ/cm$^2$ of ultraviolet rays to the saturated value can be taken as an index showing the curing rate of the resin. In (a) and (c), the ratio is almost equal. TO the contrary, in (b), the ratio is small as compared with (a) and (c) and thus it can be confirmed that the curing rate is low. Namely, in the case of (b) where the reaction points are reduced, the Young's modulus at saturation is small but curability is poor. On the other hand, in the case of (c) where the reactive oligomer containing a non-reactive oligomer is used, the Young's modulus at saturation is small and curability is good. As is apparent from these graphs, by incorporating the (B) (meth)acryloyl group-non-containing urethane oligomer into the ultraviolet curable coating material, the Young's modulus after curing can be reduced without influencing the curability of the resin.

Moreover, with regard to the molecular weight of the (B) (meth)acryloyl group-non-containing urethane oligomer, it preferably has the same molecular weight distribution width as that of the (A) (meth)acryloyl group-containing urethane oligomer. By making the molecular weight distribution width of them the same level, compatibility of a network formed of the reactive oligomer with the non-reactive oligomer becomes good, and thus migration of the non-reactive oligomer into the other layer can be prevented.

The aliphatic polyether-based polyol and the organic polyisocyanate that are reaction ingredients for obtaining the (B) (meth)acryloyl group-non-containing urethane oligomer have the same meanings as the aliphatic polyether-based polyol and the organic polyisocyanate in the (A) (meth)acryloyl group-containing urethane oligomer have. In addition, the monohydric alcohol includes methanol, ethanol, n-propanol, i-propanol, n-butanol, i-butanol, t-butanol and the like, and methanol or ethanol is preferred.

The (C) reactive diluent is a reactive monomer and is preferably contained in an amount of 20 to 40% by weight in the ultraviolet curable coating material. When the (C) reactive diluent is contained, the application of the resin on the optical fiber (glass) is facilitated.

The (C) reactive diluent is not particularly limited but a compound having one ethylenic unsaturated group (monofunctional reactive diluent) and a compound having two or more ethylenic unsaturated groups (polyfunctional reactive diluent) are mentioned. By using the monofunctional reactive diluent and the polyfunctional reactive diluent and controlling the blend ratio of both, the Young's modulus of the ultraviolet curable coating material can be controlled. When the blend ratio of the polyfunctional reactive diluent is increased, the Young's modulus of the ultraviolet curable coating material can be increased.

Specific examples of the compound having one ethylenic unsaturated group include vinyl group-containing lactams such as N-vinylpyrrolidone and N-vinylcaprolactam, alicyclic structure-containing (meth)acrylates such as isobornyl (meth)acrylate, bornyl(meth)acrylate, tricyclodecanyl(meth)acrylate, dicyclopentanyl(meth)acrylate, dicyclopentenyl (meth)acrylate, and cyclohexyl(meth)acrylate, benzyl(meth)acrylate, 4-butylcyclohexyl(meth)acrylate, acryloylmorpholine, vinylimidazole, and vinylpyridine. Furthermore, 2-hydroxyethyl(meth)acrylate, 2-hydroxypropyl (meth)acrylate, 4-hydroxybutyl(meth)acrylate, stearyl(meth)acrylate, isostearyl(meth)acrylate, tetrahydrofurfuryl(meth)acrylate, polyethylene glycol mono(meth)acrylate, polypropylene glycol mono(meth)acrylate, methoxyethylene glycol(meth)acrylate, ethoxyethyl(meth)acrylate, methoxypolyethylene glycol(meth)acrylate, methoxypolypropylene glycol(meth)acrylate, diacetone(meth)acrylamide, isobutoxymethyl(meth)acrylamide, N,N-dimethyl(meth)acrylamide, t-octyl(meth)acrylamide, dimethylaminoethyl(meth) acrylate, diethylaminoethyl(meth)acrylate, 7-amino-3,7-dimethyloctyl (meth)acrylate, N,N-diethyl(meth)acrylamide, N,N-dimethylaminopropyl(meth)acrylamide, hydroxybutyl vinyl ether, lauryl vinyl ether, cetyl vinyl ether, 2-ethylhexyl vinyl ether, vinyloxyethoxyethyl(meth)acrylate, and vinyloxyethyl (meth)acrylate.

Specific examples of the compound having two or more ethylenic unsaturated groups include trimethylolpropane tri(meth)acrylate, pentaerythritol tri(meth)acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, trimethylolpropanetrioxyethyl (meth)acrylate, tris(2-hydroxyethyl)isocyanurate tri(meth)acrylate, tris(2-hydroxyethyl)isocyanurate di(meth)acrylate, tricyclodecanedimethanol di(meth)acrylate, a di(meth)acrylate of a diol of an ethylene oxide or propylene oxide adduct of bisphenol A, a di(meth)acrylate of a diol of an ethylene oxide or propylene oxide adduct of hydrogenated bisphenol A, an epoxy(meth)acrylate in which a (meth)acrylate is added to glycidyl ether of bisphenol A, and triethylene glycol divinyl ether.

The (D) photo radical initiator is preferably contained in an amount of 0.1 to 5% by weight in the ultraviolet curable coating material.

The (D) photo radical initiator is not particularly limited but examples thereof include 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropane-1-one, 2-hydroxy-2-methyl-1-phenylpropane-1-one, thioxanthone, diethylthioxanthone, 2-isopropylthioxanthone, 2-chlorothioxanthone, 2-methyl-1-[4-(methylthio)phenyl]-2-morpholino-propane-1-one, 2,4,6-trimethylbenzoyldiphenylphosphine oxide, and bis-(2,6-dimethoxybenzoyl)-2,4,4-trimethylpentylphosphine oxide.

The (E) surfactant is an arbitrary ingredient and is preferably contained in an amount of 0.1 to 1.0% by weight in the ultraviolet curable coating material. By incorporating the surfactant, water resistance can be improved.

As the (E) surfactant, a fatty acid ester-type nonionic surfactant is preferred, and a glycerin fatty acid ester, a sorbitan fatty acid ester, a polyoxyethylene sorbitan fatty acid ester, and a polyoxysorbitol fatty acid ester are particularly preferred.

The secondary coating layer 30 of the coated optical fiber of the invention is preferably an arbitrary layer composed of a curable resin having a relatively large Young's modulus. The layer may be formed of, for example, an ultraviolet curable resin on the outer circumference of the primary coating layer 20 and the thickness thereof may be from 10 μm to 50 μm. By providing such a layer, impact from the outside can be easily protected. In this case, the Young' modulus of the secondary coating layer 30 is preferably from 1,000 MPa to 1,800 MPa. By controlling it to the range, more remarkable effects on prevention of embrittlement of the coated optical fiber, necessary elongation, and reduction of microbending loss are easily obtained.

With regard to the coated optical fiber of the invention, an effect of lowering the microbending loss increases when a glass fiber having large (100 μm$^2$) effective cross-sectional area (Aeff) is used.

Figure 3:
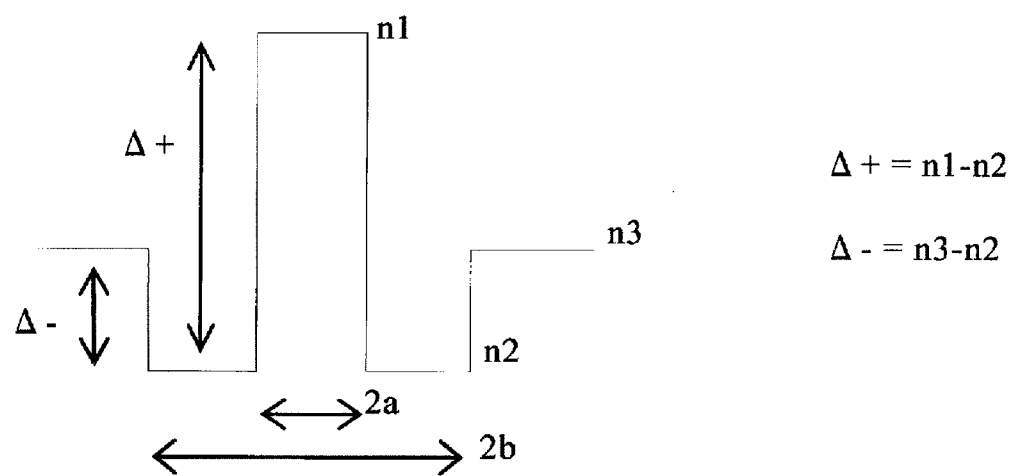
FIG. 3 is a drawing showing one example of relative refraction index distribution of the grass fiber used for the coated optical fiber of the invention.

As such a glass fiber, for example, as shown in FIG. 3, when relative refractive index of the core of the glass fiber to pure silica is n1, relative refractive index of the first cladding just outside the core to pure silica is n2, and relative refractive index of the second cladding outside the first cladding to pure silica is n3, there is mentioned a glass fiber wherein n1>n3>n2, 0.24%≤n1−n2 (Δ+)≤0.36% and 0.02%≤n3−n2 (Δ−)≤0.15%, and the diameter of the core is 11 μm or more and 15 μm or less and the ratio of the diameter of the first cladding to the diameter of the core is 2.5 or more and 6 or less.

In this regard, the above relative refractive index means a ratio of the refractive index of each of the core, the first cladding, and the second cladding to the refractive index of pure silica.

When the aforementioned material is used as the primary coating layer provided on the outer circumference of the glass fiber, the microbending loss can be remarkably suppressed.

The core and cladding of such glass fiber can be produced as follows.

As the core, germanium is added using silica glass as a base. Fluorine is added to the first cladding. The second cladding with germanium is added or is pure silica glass which does not intentionally contain any additive.

Alternatively, pure silica glass which does not intentionally contain any additive is used as the core and fluorine is added to the first cladding and the second cladding. The amount of fluorine to be added in the first cladding is made larger than the amount of fluorine to be added in the second cladding.

By enlarging the effective cross-sectional area of the glass fiber, a non-linear optical phenomenon of the glass fiber can be reduced and the microbending loss can be lowered by using the aforementioned material as the primary coating layer.

EXAMPLES

The following will describe the present invention in further detail with showing results of evaluation tests using Examples according to the invention and Comparative Examples. The invention should not be construed as being limited to these Examples.

Using coated optical fibers prepared using primary coating resins formed of ultraviolet curable coating materials containing ingredients shown in Table 1 (in the table, the numerical values of individual materials are shown as part(s) by weight) and cured resin films prepared with the ultraviolet curable coating materials, as Examples 1 to 3 and Comparative Examples 1 and 2, evaluation on lateral pressure properties (microbending loss reduction), curability, and hot-water resistance was performed in the following manner. The Young's modulus of the inner and outer coating resins in individual Examples and Comparative Examples and evaluation results are collectively shown in the following Table 1.

In the following Table 1, the (A) (meth)acryloyl group-containing urethane oligomer (2) is obtained by reducing reaction points so that the ratio of the reaction points becomes the same as the ratio of the points to the total amount of the (A) (meth)acryloyl group-containing urethane oligomer (1) and the (B) (meth)acryloyl group-non-containing urethane oligomer.

(Evaluation Method for Lateral Pressure Properties)

A coated optical fiber to be tested was wound on a bobbin having a diameter of 280 mm, which was covered with sandpaper and a bobbin having the same diameter with no sandpaper at a tension of 80 g in a single layer state, and transmission loss at a wavelength of 1.55 μm was measured by OTDR method. The coated optical fiber to be tested was a single mode optical fiber in accordance with G652 having MFD1=10.4 μm. For Δα calculated from the following equation using the transmission loss measured, evaluation was performed based on the following criteria.

$$\Delta\alpha(\text{dB/km}) = \text{Loss (with sandpaper)} - \text{Loss (without sandpaper)} \quad \text{Equation}$$

(Evaluation Criteria)

Δα<0.3 dB/km: good

Δα≥0.3 dB/km: bad (Evaluation Method for Curability)

Under air, a cured resin film having a thickness of 200 μm, which was cured with ultraviolet rays of 20 mJ/cm² or 1 J/cm², was prepared. A tensile test was performed in accordance with JIS K7127, and a curing rate (Y0.02/Y1) was calculated from the ratio of the Young's modulus of the cured film cured at 20 mJ/cm² (Y0.02) to the Young's modulus of the cured film cured at 1 J/cm² (Y1), followed by evaluation based on the following criteria.

(Evaluation Criteria)

Curing rate≥0.8: good

Curing rate<0.8: bad (Measurement Method of Young's Modulus)

The Young's modulus of the primary coating layer of the coated optical fiber was measured by the following method.

A part of coating of the coated optical fiber was removed with a jacket remover to expose the glass fiber. A portion having a length of 10 mm, on which the coating of the coated optical fiber remained, was adhered to a cylinder to fix the fiber. The glass fiber portion was chucked and pulled out at a rate of 3.5 μm/minute from the cylinder to which it was fixed and, when the load reached 0.1 (N), the length L (m) of the glass fiber pulled out from the coating layer was measured.

Young's modulus was determined according to the following equation.

$$\text{Young's modulus (Pa)} = (10(1+n)/\pi L) \cdot \ln(Dp/125)$$

Dp is the outer diameter of the primary coating layer and n is a Poisson's ratio of the primary coating layer.

(Evaluation Method of Water Resistance)

The coated optical fiber was transformed into a ribbon and was immersed in water at 60° C. for 30 days and transmission loss at a wavelength of 1.55 μm before immersion and after immersion for 30 days was measured by OTDR method. Using measured loss value, for Δα calculated according to the following equation, evaluation was performed based on the following criteria.

$$\Delta\alpha(\text{dB/km}) = \text{loss (water at 60° C. for 30 days)} - \text{loss (before immersion)} \quad \text{Equation:}$$

(Evaluation Criteria)

Δα<0.05 dB/km: good

Δα≥0.05 dB/km: bad (Measurement Method of Increase in Low-Temperature Loss)

The transmission loss of the coated optical fiber was measured and, after the coated optical fiber was placed at −40° C. for 2 hours, the transmission loss was again measured. In comparison with that before placed at −40° C., an increase in transmission loss of a light having a wavelength of 1,550 nm was determined. The case where the transmission loss is 0.03 dB/km or less is evaluated as "good" and the case where it is 0.01 dB/km or less is evaluated as "excellent", which are shown in Table 1.

(Extraction with Methyl Ethyl Ketone)

The coated optical fiber was immersed in methyl ethyl ketone (MEK) at 60° C. for 17 hours, and mass of substances having a molecular weight of 1,000 or less contained in the resulting extract was determined by means of a gas chromatographic mass spectrometer. The weight of substances having a molecular weight of more than 1,000 was determined by subtracting the weight of the substances having a molecular weight of 1,000 or less from the weight of the extract. The weight was divided by the weight of the coating layer resin of the coated optical fiber to determine weight percent of ingredients having a molecular weight of more than 1,000, which were extracted with MEK.

TABLE 1

|  | Example 1 | Example 2 | Example 3 | Comparative Example 1 | Comparative Example 2 |
|---|---|---|---|---|---|
| (A) (meth)acryloyl group-containing urethane oligomer (1) | 70 | 65 | 55 | 75 | — |
| (A) (meth)acryloyl group-containing urethane oligomer (2) | — | — | — | — | 75 |
| (B) (meth)acryloyl group-non-containing urethane oligomer | 5 | 10 | 20 | — | — |
| (C) Reactive diluent   monofunctional | 18 | 16 | 19 | 19 | 19 |
|                        polyfunctional | 2 | 4 | 1 | 1 | 1 |
| (D) Photo polymerization initiator | 1 | 1 | 1 | 1 | 1 |
| (E) Surfactant | 0.5 | 0.5 | — | — | — |
| Amount of ingredients having molecular weight of more than 1,000, extracted with MEK (% by weight) | 5 | 11 | 21 | — | — |
| Young's modulus of primary coating layer (MPa) | 0.6 | 1.0 | 0.2 | 1.2 | 0.4 |
| Lateral pressure properties | good | good | good | bad | good |
| Curability | good | good | good | good | bad |
| Low-temperature properties | excellent | excellent | good | excellent | good |
| Water resistance | good | good | bad | bad | bad |

From the above results, it is confirmed that the primary coating layer resins formed of the ultraviolet curable coating material containing the (A) (meth)acryloyl group-containing urethane oligomer and the (B) (meth)acryloyl group-non-containing urethane oligomer (Examples 1 to 3) are satisfactory in both of the lateral pressure properties and the curability.

On the other hand, in Comparative Examples 1 and 2 where the (B) (meth)acryloyl group-non-containing urethane oligomer is not contained, both of the lateral pressure properties and the curability cannot be satisfactorily maintained. Namely, the lateral pressure properties are inferior in Comparative Example 1 where Young's modulus is high, and the curability is poor in Comparative Example 2 where the Young's modulus is lowered by decreasing the reaction points of the (A) (meth)acryloyl group-containing urethane oligomer.

When the Young's modulus of the primary coating layer after curing is from 0.6 to 1.0 MPa, the layer is particularly excellent in low-temperature properties. The Young's modulus can be increased by increasing the blend ratio of the polyfunctional reactive diluent (monomer) among the reactive diluents (monomers). In the case of the above Examples, the low-temperature properties are particularly excellent when the ratio of the polyfunctional reactive diluent to the monofunctional reactive diluent is 1/9 or more.

By adding a surfactant, the water resistance can be made satisfactory.

(Examples 4 to 6, Comparative Examples 3 to 5)

The following table shows the microbending loss of each of the coated optical fibers where the relative refractive index distribution of the core and the cladding were as in FIG. 3 and the following table and the coating layer was as in Example 2.

The microbending loss was measured as described below.

The coated optical fiber was wound on a bobbin having a body diameter of 400 mm, of which surface was covered with a wire mesh having a diameter of 50 μm and a space of 100 μm, at a tension of 80 g so that the coated optical fiber was not overlapped. The transmission loss of a light having a wavelength of 1,550 nm was measured in this state.

As shown in the table, it is realized that the coated optical fiber of the invention exhibits a large effect on the reduction of the microbending loss (in other words, the lateral pressure properties are good) in the case where Aeff of the glass fiber core is large.

TABLE 2

| | Parameter | | | | | | | | | | | |
|---|---|---|---|---|---|---|---|---|---|---|---|---|
| | $\Delta+$ | $\Delta-$ | 2a | b/a | Glass diameter | Dispersion | Dispersion slope Wavelength | MFD | Aeff | $\lambda c$ | Bending loss 20 mmφ | Microbending loss (wire mesh)* |
| | | | | | | 1550 nm | 1550 nm | 1550 nm | 1550 nm | — | 1550 nm | 1550 nm |
| | | | | | | | Unit | | | | | |
| | % | % | μm | — | μm | ps/nm/km | ps/nm²/km | μm | μm² | nm | dB/m | dB/km |
| Example 4 | 0.34 | 0.077 | 12 | 4.2 | 125 | 20.5 | 0.059 | 11.6 | 100 | 1.5 | 0.4 | 0.06 |
| Example 5 | 0.3 | 0.08 | 13.2 | 3.0 | 125 | 20.5 | 0.062 | 12.6 | 131 | 1.49 | 8 | 0.58 |
| Example 6 | 0.252 | 0.091 | 14.2 | 3.4 | 125 | 21.2 | 0.061 | 13.1 | 145 | 1.41 | 12 | 0.95 |

What is claimed is:

1. A coated optical fiber comprising a glass fiber and a primary coating layer on the outer circumference of the glass fiber,
   wherein a resin constituting the primary coating layer contains an ingredient having a molecular weight of more than 1,000, which is extracted with methyl ethyl ketone, in an amount of 5% by weight or more and 21% by weight or less and has a Young's modulus of 0.2 to 1.0 MPa, wherein the resin constituting the primary coating layer contains the following (A) and (B), and the (B) has a width of molecular weight distribution the same as that of the following (A):
   (A) a (meth)acryloyl group-containing urethane oligomer obtained by reacting at least an aliphatic polyether-based polyol, an organic polyisocyanate, a hydroxyl group-containing (meth)acrylate, and γ-mercaptopropyltrimethoxysilane;

(B) a (meth)acryloyl group-non-containing urethane oligomer obtained by reacting at least an aliphatic polyether-based polyol, an organic polyisocyanate, and a monohydric alcohol.

2. The coated optical fiber according to claim 1, wherein the resin constituting the primary coating layer contains a reactive oligomer having a reactive group and a molecular weight of 5,000 to 30,000.

3. The coated optical fiber according to claim 1, wherein an increase in transition loss when it is placed at −40° C. for 2 hours is 0.01 dB/km or less.

4. The coated optical fiber according to claim 1, wherein the Young's modulus of the primary coating layer is from 0.6 to 1.0 MPa.

5. The coated optical fiber according to claim 1, wherein the Young's modulus of the primary coating layer is from 0.6 to 1.0 MPa and an increase in transition loss when the coated optical fiber is placed at −40° C. for 2 hours is 0.01dB/km or less.

6. The coated optical fiber according to claim 1, wherein a secondary coating layer is further provided outside the primary coating layer and the Young's modulus of the secondary coating layer is from 1,000 MPa to 1,800 MPa.

7. The coated optical fiber according to claim 1, wherein the ultraviolet curable coating material further contains (E) a surfactant.

8. The coated optical fiber according to claim 7, wherein the ultraviolet curable coating material contains the surfactant in an amount of 0.1 to 1.0% by weight.

9. The coated optical fiber according to claim 1, wherein the resin constituting the primary coating layer is an ultraviolet curable coating material containing a reactive diluent composed of a monofunctional reactive diluent and a polyfunctional reactive diluent and the ratio of the polyfunctional reactive diluent to the monofunctional reactive diluent is 1/9 or more.

10. The coated optical fiber according to claim 1, wherein effective cross-sectional area of the core of the glass fiber is larger than 100 μm².

11. The coated optical fiber according to claim 10, wherein, when relative refractive index of the core of the glass fiber to pure silica is n1, relative refractive index of the first cladding just outside the core to pure silica is n2, and relative refractive index of the second cladding outside the first cladding to pure silica is n3, n1>n3>n2, 0.24%≤n1−n2≤0.36% and 0.02%≤n3−n2≤0.15%, and the diameter of the core is 11 μm or more and 15 μm or less and the ratio of the diameter of the first cladding to the diameter of the core is 2.5 or more and 6 or less.

12. A coated optical fiber comprising a glass fiber and a primary coating layer on the outer circumference of the glass fiber,
wherein a resin constituting the primary coating layer contains an ingredient having a molecular weight of more than 1,000, which is extracted with methyl ethyl ketone, in an amount of 5% by weight or more and 21% by weight or less and has a Young's modulus of 0.2 to 1.0 MPa, wherein the resin constituting the primary coating layer contains the following (A) and the (A) accounts for 80 to 95% by weight of the total oligomer contained in the primary coating layer:
(A) a (meth)acryloyl group-containing urethane oligomer obtained by reacting at least an aliphatic polyether-based polyol, an organic polyisocyanate, a hydroxyl group-containing (meth)acrylate, and γ-mercaptopropyltrimethoxysilane.

13. The coated optical fiber according to claim 12, wherein the resin constituting the primary coating layer contains a reactive oligomer having a reactive group and a molecular weight of 5,000 to 30,000.

14. The coated optical fiber according to claim 12, wherein an increase in transition loss when it is placed at −40° C. for 2 hours is 0.01 dB/km or less.

15. The coated optical fiber according to claim 12, wherein the Young's modulus of the primary coating layer is from 0.6 to 1.0 MPa.

16. The coated optical fiber according to claim 12, wherein the Young's modulus of the primary coating layer is from 0.6 to 1.0 MPa and an increase in transition loss when the coated optical fiber is placed at −40° C. for 2 hours is 0.01 dB/km or less.

17. The coated optical fiber according to claim 12, wherein a secondary coating layer is further provided outside the primary coating layer and the Young's modulus of the secondary coating layer is from 1,000 MPa to 1,800 MPa.

18. The coated optical fiber according to claim 12, wherein the ultraviolet curable coating material further contains (E) a surfactant.

19. The coated optical fiber according to claim 18, wherein the ultraviolet curable coating material contains the surfactant in an amount of 0.1 to 1.0% by weight.

20. The coated optical fiber according to claim 12, wherein the resin constituting the primary coating layer is an ultraviolet curable coating material containing a reactive diluent composed of a monofunctional reactive diluent and a polyfunctional reactive diluent and the ratio of the polyfunctional reactive diluent to the monofunctional reactive diluent is 1/9 or more.

21. The coated optical fiber according to claim 12, wherein effective cross-sectional area of the core of the glass fiber is larger than 100 μm².

22. The coated optical fiber according to claim 21, wherein, when relative refractive index of the core of the glass fiber to pure silica is n1, relative refractive index of the first cladding just outside the core to pure silica is n2, and relative refractive index of the second cladding outside the first cladding to pure silica is n3, n1>n3>n2, 0.24%≤n1−n2≤0.36% and 0.02%≤n3−n2≤0.15%, and the diameter of the core is 11 μm or more and 15 μm or less and the ratio of the diameter of the first cladding to the diameter of the core is 2.5 or more and 6 or less.

23. A coated optical fiber comprising a glass fiber and a primary coating layer on the outer circumference of the glass fiber,
wherein a resin constituting the primary coating layer contains an ingredient having a molecular weight of more than 1,000, which is extracted with methyl ethyl ketone, in an amount of 5% by weight or more and 21% by weight or less and has a Young's modulus of 0.2 to 1.0 MPa, wherein the resin constituting the primary coating layer contains:
(A) a (meth)acryloyl group-containing urethane oligomer obtained by reacting at least an aliphatic polyether-based polyol, an organic polyisocyanate, a hydroxyl group-containing (meth)acrylate, and γ-mercaptopropyltrimethoxysilane;
(B) a (meth)acryloyl group-non-containing urethane oligomer obtained by reacting at least an aliphatic polyether-based polyol, an organic polyisocyanate, and a monohydric alcohol;

(C) a reactive diluent; and
(D) a photo radical initiator.

24. The coated optical fiber according to claim 23, wherein the resin constituting the primary coating layer contains a reactive oligomer having a reactive group and a molecular weight of 5,000 to 30,000.

25. The coated optical fiber according to claim 23, wherein an increase in transition loss when it is placed at −40° C. for 2 hours is 0.01 dB/km or less.

26. The coated optical fiber according to claim 23, wherein the Young's modulus of the primary coating layer is from 0.6 to 1.0 MPa.

27. The coated optical fiber according to claim 23, wherein the Young's modulus of the primary coating layer is from 0.6 to 1.0 MPa and an increase in transition loss when the coated optical fiber is placed at −40° C. for 2 hours is 0.01 dB/km or less.

28. The coated optical fiber according to claim 23, wherein a secondary coating layer is further provided outside the primary coating layer and the Young's modulus of the secondary coating layer is from 1,000 MPa to 1,800 MPa.

29. The coated optical fiber according to claim 23, wherein the ultraviolet curable coating material further contains (E) a surfactant.

30. The coated optical fiber according to claim 29, wherein the ultraviolet curable coating material contains the surfactant in an amount of 0.1 to 1.0% by weight.

31. The coated optical fiber according to claim 23, wherein the resin constituting the primary coating layer is an ultraviolet curable coating material containing a reactive diluent composed of a monofunctional reactive diluent and a polyfunctional reactive diluent and the ratio of the polyfunctional reactive diluent to the monofunctional reactive diluent is 1/9 or more.

32. The coated optical fiber according to claim 23, wherein effective cross-sectional area of the core of the glass fiber is larger than 100 $\mu m^2$.

33. The coated optical fiber according to claim 32, wherein, when relative refractive index of the core of the glass fiber to pure silica is n1, relative refractive index of the first cladding just outside the core to pure silica is n2, and relative refractive index of the second cladding outside the first cladding to pure silica is n3, n1>n3>n2, 0.24%≤n1−n2≤0.36% and 0.02%≤n3−n2≤0.15%, and the diameter of the core is 11 $\mu m$ or more and 15 $\mu m$ or less and the ratio of the diameter of the first cladding to the diameter of the core is 2.5 or more and 6 or less.

* * * * *